United States Patent [19]

Lehr

[11] Patent Number: 4,780,497

[45] Date of Patent: Oct. 25, 1988

[54] REDUCED MELT VISCOSITY CPVC BLENDS CONTAINING SULFUR AND VARIOUS METAL CARBONATE STABILIZERS

[75] Inventor: Marvin H. Lehr, Akron, Ohio

[73] Assignee: The B. F. Goodrich Company, Akron, Ohio

[21] Appl. No.: 155,384

[22] Filed: Feb. 12, 1988

[51] Int. Cl.$^4$ .......................... C08K 3/26; C08K 7/14; C08K 7/06; C08L 27/24

[52] U.S. Cl. .................................. 524/424; 523/516; 524/418; 524/494; 524/496; 524/514; 524/567

[58] Field of Search ............... 524/424, 567, 418, 514, 524/496, 494; 523/516

[56] References Cited

U.S. PATENT DOCUMENTS

| | | | |
|---|---|---|---|
| 4,177,187 | 12/1979 | Bohen | 524/424 |
| 4,394,325 | 7/1983 | Bresser et al. | |
| 4,440,674 | 4/1984 | Dieckmann et al. | 524/424 |
| 4,501,849 | 2/1985 | Bourland | 524/527 |
| 4,515,916 | 5/1985 | Molt | 524/424 |
| 4,711,921 | 12/1987 | Lehr . | |

FOREIGN PATENT DOCUMENTS

| | | |
|---|---|---|
| 2519995 | 7/1983 | France . |
| 717118 | 2/1980 | U.S.S.R. . |
| 1151565 | 4/1985 | U.S.S.R. . |

OTHER PUBLICATIONS

Article to David F. Lawson, Research Disclosure, Oct. 1979, pp. 556–557.

*Primary Examiner*—Herbert J. Lilling
*Attorney, Agent, or Firm*—James R. Lindsay; Daniel J. Hudak

[57] ABSTRACT

Chlorinated polyvinyl chloride when blended with sulfur is often miscible and has reduced melt flow viscosity. Various metal carbonates impart improved stability and optionally various fibers can be utilized to increase the tensile strength of the composition.

16 Claims, No Drawings

REDUCED MELT VISCOSITY CPVC BLENDS CONTAINING SULFUR AND VARIOUS METAL CARBONATE STABILIZERS

FIELD OF THE INVENTION

Chlorinated polyvinyl chloride when blended with sulfur and various metal carbonates have reduced melt flow viscosity and improved stability with regard to dehydrohalogenation.

BACKGROUND ART

Heretofore, various tin compounds such as dibutylin-S,S'-bis-isooctyl mercaptoacetate, have been utilized to improve the stability of chlorinated polyvinyl chloride.

The article Sulfur-Containing, Smoke-Inhibited Polymer Compositions, Research Disclosure, October 1979, pp 556–57, relates to reduced smoke generation of polymers such as polyvinyl chloride obtained by the addition of sulfur or sulfur-containing compounds.

U.S. Pat. No. 4,394,325 to Bresser et al relates to an inorganic antimony compound composition comprising at least one organic antimony compound having at least 1 antimony-sulfur-carbon linkage and as a stabilizer therefore, elemental sulfur.

U.S. Pat. No. 4,711,921 to Lehr relates to the use of $BaCO_3$ with various organotin compounds, such as dibutyltin-S,S'-bis-isooctyl mercaptoacetate, in chlorinated polyvinyl chloride polymers to improve the heat stability thereof.

Soviet Pat. No. 717,118 to Nizhnik et al relates to improved cohesive strength of an adhesive and its adhesion to asphaltic concrete wherein the adhesive contains a chlorinated polyvinyl chloride, a plasticizer, rosin, and sulfur.

French Pat. No. 2,519,995 to Du Saint Heveny, relates to a laminate applied to a ship hull to reduce cracking. The topcoat of the laminate contains polyvinyl chloride having copper oxide and flowers of sulfur therein.

Russian Pat. No. 1,151,565 to Vyborov et al relates to an adhesive composition containing chlorinated polyvinyl chloride, sulfur, and diethanolamine-formaldehyde-tri(p-aminophenyl)methane which increases the binding strength of the compound to vulcanizates containing unsaturated rubbers.

SUMMARY OF THE INVENTION

Utilization of sulfur blended with chlorinated polyvinyl chloride results in improved melt flow characteristics, that is a reduced melt flow viscosity of at least 10 percent, desirably at least 25 percent, and often in excess of 50 percent. Every 100 parts by weight of chlorinated polyvinyl chloride (57 or 58 percent to about 72 percent by weight of chlorine therein) contains from about 3 parts to about 42 parts by weight of sulfur which often is miscible therewith and is stabilized with from about 1 to about 10 parts by weight of a stabilizing compound such as a metal carbonate. Optionally, various fibers are incorporated into the blend to yield an improved flex modulus. The fibers can be inorganic or organic such as fiberglass, polyester, graphite, polyaramid, and the like.

DETAILED DESCRIPTION OF THE INVENTION

The chlorinated polyvinyl chloride (CPVC) of the present invention contains from about 57 or 58 percent to about 72 percent by weight and preferably from about 63 percent to about 70 percent by weight of chlorine therein based upon the total weight of the polymer. The preparation of CPVC is well known to the art and to the literature. CPVC however is generally unstable at high processing temperatures such as at least 200° C. and must be stabilized. Conventional stabilizers often promote undesired crosslinking of the polymer and, when organotin sulfide stabilizers are utilized in the presence of sulfur, they result in an accelerated blackening of the resin. The stabilizers of the present invention, however, have been found to stabilize the resin better than when conventional stabilizers are used.

The utilization of sulfur has been found to generally improve fusion and melt flow of the CPVC resin as well as reduce the tendency thereof to crystallize. Generally, an amount of from about 3 to about 42 parts by weight and preferably from about 5 to about 20 parts by weight of sulfur is utilized for every 100 parts by weight of the CPVC resin.

The stabilizers which are utilized in the present invention are metal carbonates. Examples of metal carbonates include barium carbonate, cadmium carbonate, and lead carbonate with barium carbonate being preferred. The amount of stabilizer is generally from about 1 to about 13 parts by weight and preferably from about 3 to about 7 parts by weight per 100 parts by weight of the CPVC resin.

In order to improve the flex modulus of the blend, various organic and inorganic fibers are optionally utilized so long as the blend has adherence to the fibers. Examples of suitable inorganic fibers include fiberglass, and the like, whereas examples of organic fibers include graphite, polyester, polyaramid, and the like. The amount of fibers is from about 5 to about 75 parts by weight and preferably from about 10 to about 40 parts by weight per 100 parts by weight of the total CPVC blend or composition, that is based upon the total weight of the CPVC resin, the sulfur, the stabilizers, as well as any other additives. When fiberglass is utilized as a fiber, it desirably has a coupling agent thereon. Generally, any conventional coupling agent can be utilized such as various amino silane compounds as set forth in U.S. Pat. No. 4,536,360 to Rahrig which is hereby fully incorporated by reference.

The CPVC blend can contain various conventional compounding aids in desired amounts as known in the art as well as to the literature. For example, various conventional lubricants such as oxidized polyethylene, paraffin wax, and the like can be utilized. Various impact modifiers can be utilized but must be saturated to avoid reaction with sulfur. These include the various acrylates such as polymethylmethacrylate grafted onto polybutylacrylate, and the like. Examples of suitable fillers include titanium dioxide, mica, wollastonite, and the like. Other additives include various conventional antioxidants, and processing aids including those known to the art and to the literature.

The above blends are prepared by powder blending the various ingredients followed by fusion in a heated mixer such as a mill, a Banbury, an extruder, or the like. The order of addition is generally not important.

An important benefit of the use of sulfur is the improved melt flow of the CPVC resin. As noted above, CPVC compounds generally do not possess good melt flow or processability. Utilization of the sulfur not only improves the flow characteristics as well as wetting properties of the resin, but improves adhesion with the fibers as well.

The CPVC blends of the present invention generally exhibit improved melt flow as measured by reduced melt flow viscosity of at least 10 percent, desirably at least 25 percent, and preferably at least 50 percent in comparison to non-blended CPVC resins. Such blends additionally have improved stability as noted hereinabove. Moreover, the sulfur is often miscible with the CPVC resin, that is is partially soluble therein. By the term "miscible," it is meant that a single phase system is formed which is generally clear to the naked eye and has a single glass transition temperature. Miscible systems which are produced will vary depending upon the amount of sulfur, the temperature, and pressure.

The CPVC blends of the present invention can be utilized as protective coatings for metal, concrete, wood products, and the like.

The invention will be better understood by reference to the following examples.

The following formulations were prepared:

TABLE I

| INGREDIENTS | 1 | 2 | 3 | 4 |
|---|---|---|---|---|
| Nippon Carbide T-382 (CPVC 68% Cl) | 100 | 80 | 80 | 80 |
| Thermolite 31 a tin stabilizer | 2.0 | 2.0 | — | — |
| TiO$_2$ | 5.0 | 5.0 | 5.0 | 5.0 |
| BaCO$_3$ | — | — | — | 5.0 |
| S | — | 20 | 20 | 20 |
| Oxidized PE lubricant | 1.25 | 1.25 | 1.25 | 1.25 |
| DTS* (min) | 26 | 21 | 20 | 29 |
| Torque Minimum Newton-Meters | 38.5 | 18.5 | 16.5 | 18.5 |
| State | crumb at 30' | crumb at 26' | no crumb at 24' | slight crumb at 50' |

*Dynamic thermal stability — the time at which the torque rises 1 newton-meter above its minimum point. Usually this indicates the onset of decomposition, that is, dehydrohalogenation and crosslinking.

As apparent from the above table, the addition of the sulfur resulted in a drastic reduction in processing torque. Hence, improved melt flow and fusion was imparted by the addition of the sulfur. The addition of a metal carbonate stabilizer such as barium carbonate as in Formula 4 resulted in improved stability as measured by DTS.

Sulfur was found to be partially miscible in CPVC as indicated by the results in Table II. Both differential scanning calorimetery (DSC) and optical tests help to estimate the solubility limits as a function of temperature. In the DSC analysis, both the CPVC glass transition temperature (Tg) and the sulfur melting peak at about 120° C. were sought. However, because the DSC tests do not clearly define the solubility of the sulfur in CPVC owing to the effect of melt viscosity on the rate of sulfur crystallization, visual observation of the hot and cold blends were also included. The preparation and thermal treatment of these blends are described after the table.

TABLE II

|  | A | B | C | D | E |
|---|---|---|---|---|---|
| CPVC Nippon Carbide T-382 —68% Cl | 100 | 95 | 90 | 80 | 70 |
| Sulfur | — | 5 | 10 | 20 | 30 |
| BaCO$_3$ | 5 | 5 | 5 | 5 | 5 |
| PE | 0.5 | 0.5 | 0.5 | 0.5 | 0.5 |
| Tg (°C.) | 132 | 121 | 112 | 109 | —* |
| Tm (°C.) | — | — | — | — | 118 |
| eta (kPa · s) | 2.89 | 2.39 | 1.95 | 0.85 | 0.59 |
| % Viscosity Reduction | 0 | 17 | 33 | 71 | 80 |

*Tg obscured by sulfur melting peak.

After powder blending the ingredients and heating in an oven at 150° C. for 15 min to allow the resin to soak up the sulfur, the above formulations were fluxed on a 2-roll mill at 190° C. for 2–3.5 min. The Tg and Tm results were recorded on a Perkin Elmer DSC-2 differential scanning calorimeter after heating the samples first to 170° C. In the first heat scan, only composition E showed a sulfur melting peak at 118° C., which was still present in the second heat scan. This clearly indicated a separate sulfur phase in which the sulfur molecules had sufficient mobility to crystallize on cooling. The melt flow improvement data set forth in kilopascals seconds and percent reduction was obtained utilizing an Instron rheometer at 210° C. at a shear rate of 297 s$^{-1}$, using a die with a 0.13 centimeter diameter and a length-/diameter ratio of 10. As apparent from the data, good melt viscosity reductions were obtained as the amount of sulfur utilized was increased.

The CPVC/S partially miscible system exhibits an upper critical solution temperature, as apparent from Table III. That is to say, the solubility of the CPVC/S blend increases with temperature. This was shown by the following experiments in which the optical properties of different compositions were observed while the stock was hot on the mill and after it had cooled to room temperature. Owing to the presence of BaCO$_3$ stabilizer, which was insoluble in the polymer blend, the mixtures were translucent instead of transparent. These experiments show that the limit of solubility of sulfur in a 68 weight percent chlorine CPVC resin at 190° C. is between 12.5 and 15 percent. One skilled in the technology of polymer alloying would expect that the solubility of sulfur in CPVC to depend on the weight percent of chlorine in the resin as well as on the molecular weight of the polymer. Indeed, similar experiments with PVC, which contains 56.5 weight percent chlorine, showed that at 190° C. the limit of solubility of sulfur was between 5–10 percent.

TABLE III

|  | F | G | H | I |
|---|---|---|---|---|
| CPVC same as above | 90 | 87.5 | 85 | 82.5 |
| S | 10 | 12.5 | 15 | 17.5 |
| BaCO$_3$ | 5 | 5 | 5 | 5 |
| PE | 0.5 | 0.5 | 0.5 | 0.5 |
| 190° C. | T | T | SO | O |
| 25° C. | T | T* | O | O |

T = Translucent
SO = Slightly Opaque
O = Opaque
* = Thicker edges of sheet slightly opaque

TABLE IV

|  | J | K | L | M |
|---|---|---|---|---|
| TempRite CPVC 687 × 563 (67% Cl) | 100 | 95 | 90 | 80 |
| Sulfur | — | 5 | 10 | 20 |
| BaCO$_3$ |  |  |  |  |
| PE (Allied AC-629A) | 0.5 | 0.5 | 0.5 | 0.5 |
| Glass fibers | 40 | 40 | 40 | 40 |

TABLE IV-continued

| | J | K | L | M |
|---|---|---|---|---|
| (Owens Corning CRX) | | | | |
| Tensile (psi) | 15,500 | 12,660 | 18,010 | 17,120 |
| S.D.* ± | 1,860 | 430 | 220 | 220 |
| no. samples | 6 | 5 | 4 | 3 |

*Standard deviation

Powder ingredients without glass fibers were mixed for 2 min. in a blender, then heated at 150° C. for 15 min. to enable the resin to absorb the sulfur. The mixture was fluxed on a 2-roll mill at 190° C. while adding the glass fibers.

Without glass fibers the tensile strength of a 67 weight percent chlorine CPVC is about 10,000 psi. As expected, the addition of 40 weight percent glass fibers increased the tensile strength, but as indicated by the standard deviation (12 percent), the values were quite variable. This suggests possibly poor uniformity in adhesion between the matrix polymer and the glass fibers. However, unexpectedly when 10-20 percent sulfur (based on CPVC+S=100) was added, the variability dropped to less than 2 percent and the tensile value increased slightly. This improvement in tensile properties suggests improved adhesion between the glass and matrix.

While in accordance with the Patent Statutes, the best mode and preferred embodiment have been set forth, the scope of the invention is not limited thereto, but rather by the scope of the attached claims.

What is claimed is:

1. A stabilized chlorinated polyvinyl chloride blend, comprising:
   approximately 100 parts by weight of a chlorinated polyvinyl chloride resin, said resin containing from about 58 percent to about 72 percent by weight of chlorine therein, from about 3 parts to about 42 parts by weight of sulfur per 100 parts by weight of said chlorinated polyvinyl chloride resin, and from 1 to about 13 parts by weight of a metal carbonate stabilizing compound per 100 parts by weight of said chlorinated polyvinyl chloride resin.

2. A stabilized chlorinated polyvinyl chloride blend according to claim 1, wherein said stabilizing agent is barium carbonate, lead carbonate, cadmium carbonate, or combinations thereof.

3. A stabilized chlorinated polyvinyl chloride blend according to claim 2, wherein the amount of said sulfur is from about 5 parts to about 20 parts by weight per 100 parts by weight of said chlorinated polyvinyl chloride resin.

4. A stabilized chlorinated polyvinyl chloride blend according to claim 3, wherein said chlorinated polyvinyl chloride resin contains from 63 percent to about 70 percent by weight of chlorine therein.

5. A stabilized chlorinated polyvinyl chloride blend according to claim 4, wherein the amount of said carbonate compound is from about 3 parts to about 7 parts by weight per 100 parts by weight of said chlorinated polyvinyl chloride resin.

6. A stabilized chlorinated polyvinyl chloride blend according to claim 1, including from about 5 parts to about 75 percent by weight of fibers per 100 parts by weight of said chlorinated polyvinyl chloride blend.

7. A stabilized chlorinated polyvinyl chloride blend according to claim 2, including from about 10 parts to about 40 parts by weight of fibers per 100 parts by weight of said chlorinated polyvinyl chloride blend, and wherein said fibers are fiberglass, graphite, polyaramid, or a polyester.

8. A stabilized chlorinated polyvinyl chloride blend according to claim 4, including from about 10 parts to about 40 parts by weight of fibers per 100 parts by weight of said chlorinated polyvinyl chloride blend, and wherein said fibers are fiberglass, graphite, polyaramid, or a polyester.

9. A chlorinated polyvinyl chloride composition having a reduced melt flow viscosity, comprising:
   a chlorinated polyvinyl chloride resin, said resin containing from about 58 percent to about 72 percent by weight of chlorine therein, from about 1 part to about 13 parts by weight of a metal carbonate stabilizing compound per 100 parts by weight of said chlorinated polyvinyl chloride resin, and an effective amount of sulfur to reduce the melt viscosity of said chlorinated polyvinyl chloride resin by at least 10 percent.

10. A chlorinated polyvinyl chloride composition according to claim 9, wherein said metal of said metal salt and of said metal carbonate is barium, lead, or cadmium.

11. A chlorinated polyvinyl chloride composition according to claim 10, wherein said effective amount of sulfur reduces the melt flow viscosity of said chlorinated polyvinyl chloride resin by at least 25 percent, and wherein said resin contains from about 63 percent to about 70 percent of chlorine.

12. A chlorinated polyvinyl chloride composition according to claim 11, wherein the amount of said metal carbonate stabilizing compound is from about 3 parts to about 7 parts by weight per 100 parts by weight of said chlorinated polyvinyl chloride resin.

13. A chlorinated polyvinyl chloride composition according to claim 12, wherein the amount of sulfur reduces the melt flow viscosity of said chlorinated polyvinyl chloride resin by at least 50 percent.

14. A chlorinated polyvinyl chloride composition according to claim 9, including from about 5 parts to about 75 percent by weight of fibers per 100 parts by weight of said chlorinated polyvinyl chloride blend.

15. A chlorinated polyvinyl chloride composition according to claim 10, including from about 10 parts to about 40 parts by weight of fibers per 100 parts by weight of said chlorinated polyvinyl chloride ble, and wherein said fibers are fiberglass, graphite, polyaramid, and polyester.

16. A chlorinated polyvinyl chloride composition according to claim 12, including from about 10 parts to about 40 parts by weight of fibers per 100 parts by weight of said chlorinated polyvinyl chloride blend, and wherein said fibers are fiberglass, graphite, polyaramid, and a polyester.

* * * * *